No. 842,209.　　　　　　　　　　　　　　　　PATENTED JAN. 29, 1907.
C. R. KNAPP & V. MULHOLLAND.
DEVICE FOR INTRODUCING GLASS TO LEERS.
APPLICATION FILED APR. 8, 1905.
5 SHEETS—SHEET 4.
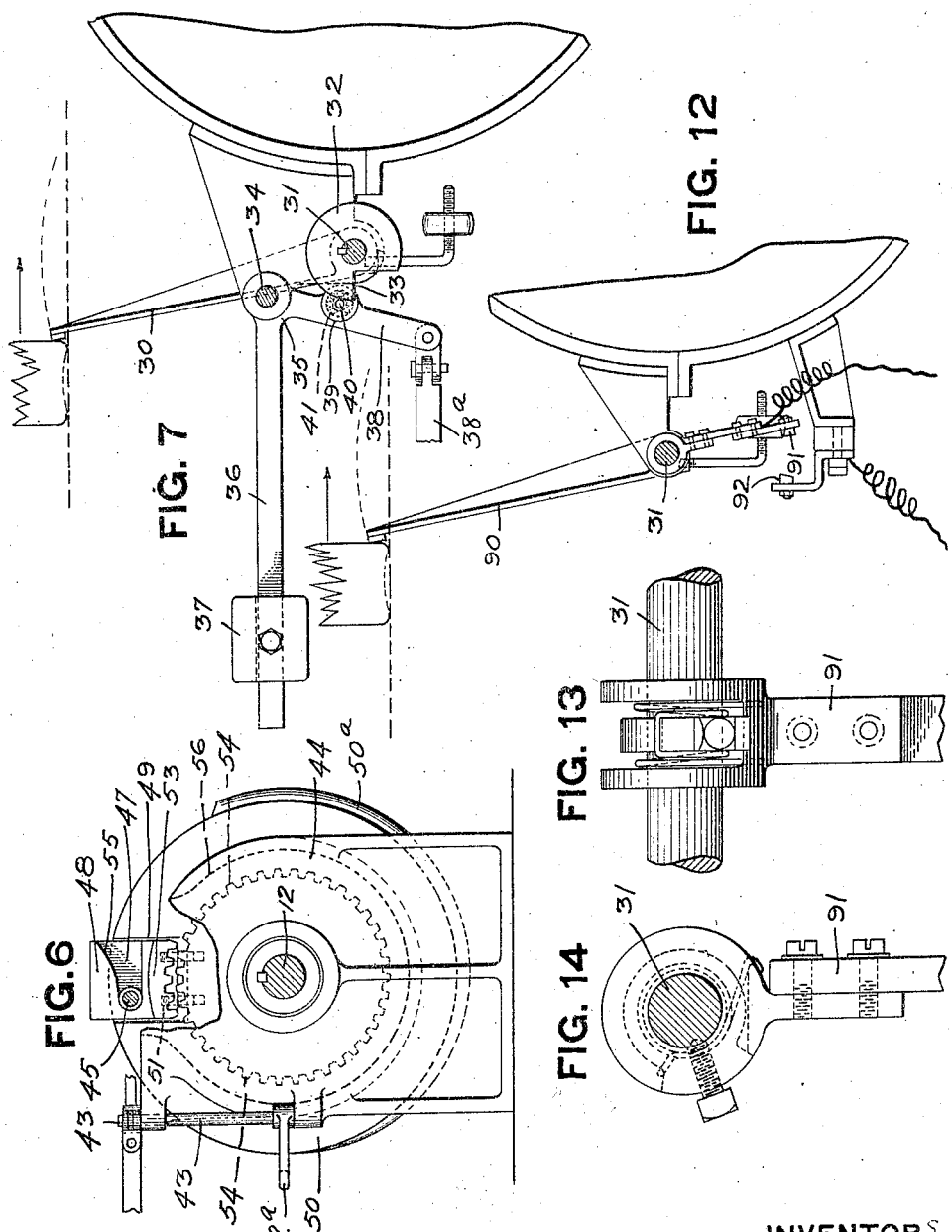
WITNESSES.
INVENTORS No. 842,209. PATENTED JAN. 29, 1907.
C. R. KNAPP & V. MULHOLLAND.
DEVICE FOR INTRODUCING GLASS TO LEERS.
APPLICATION FILED APR. 8, 1905.
5 SHEETS—SHEET 5.
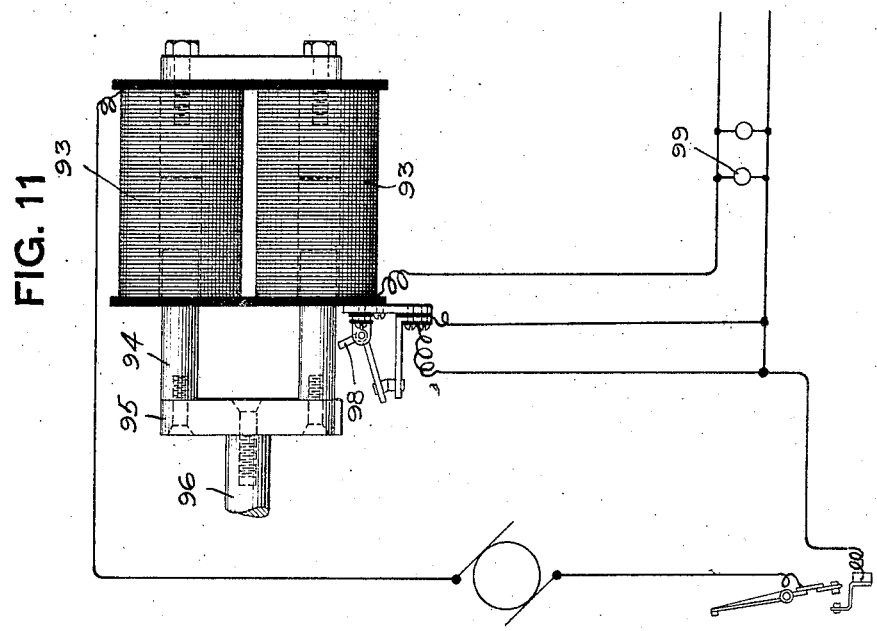
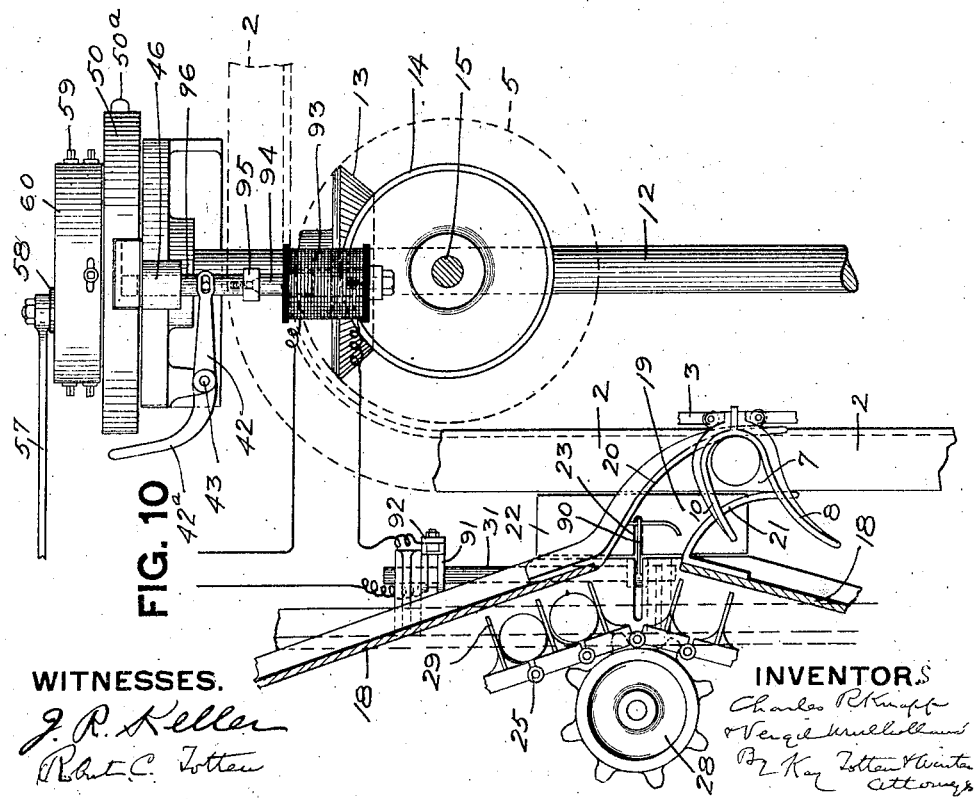
WITNESSES.
J. R. Keller
Robt. C. Totten
INVENTORS
Charles R. Knapp
Vergil Mulholland
By Kay Totten & Winter
Attorneys

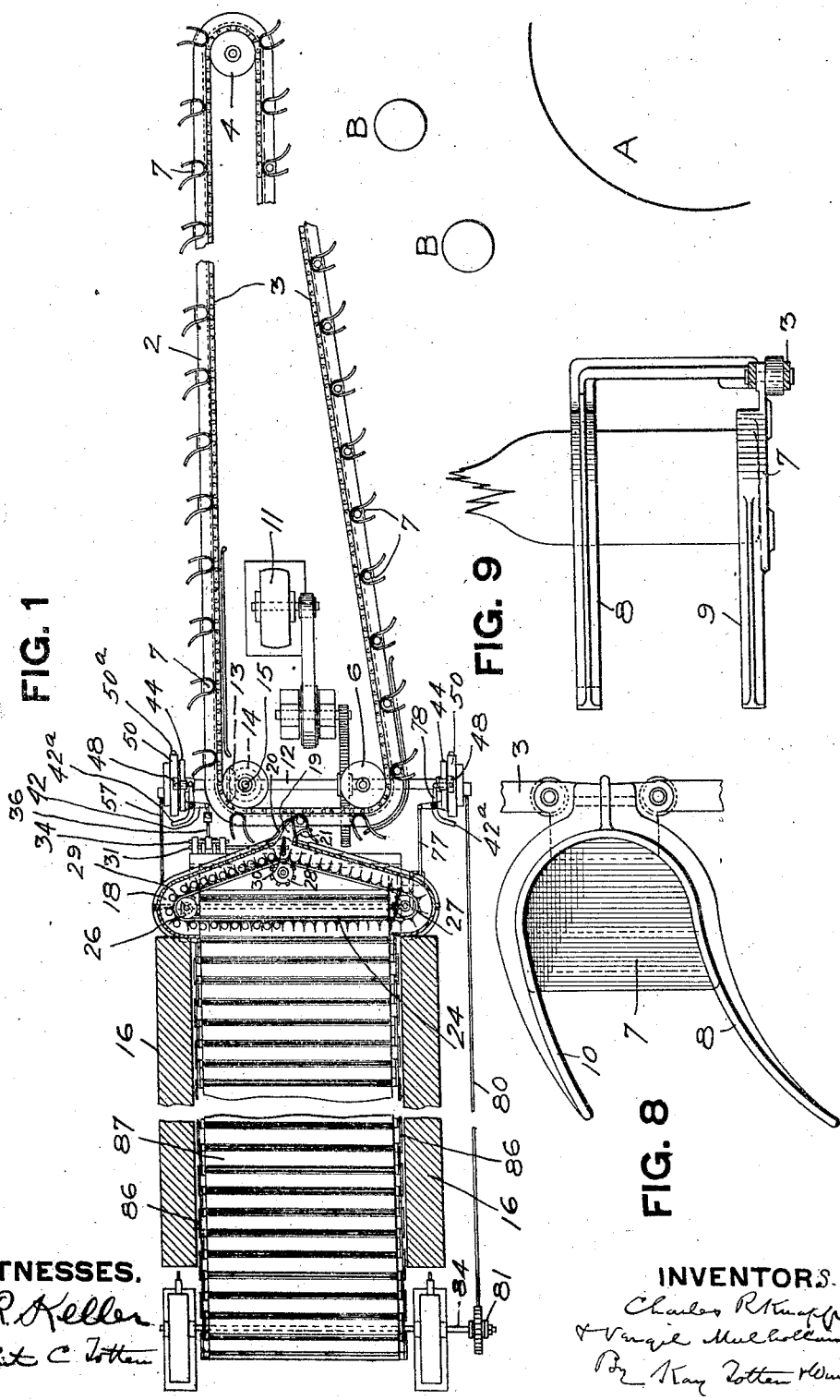

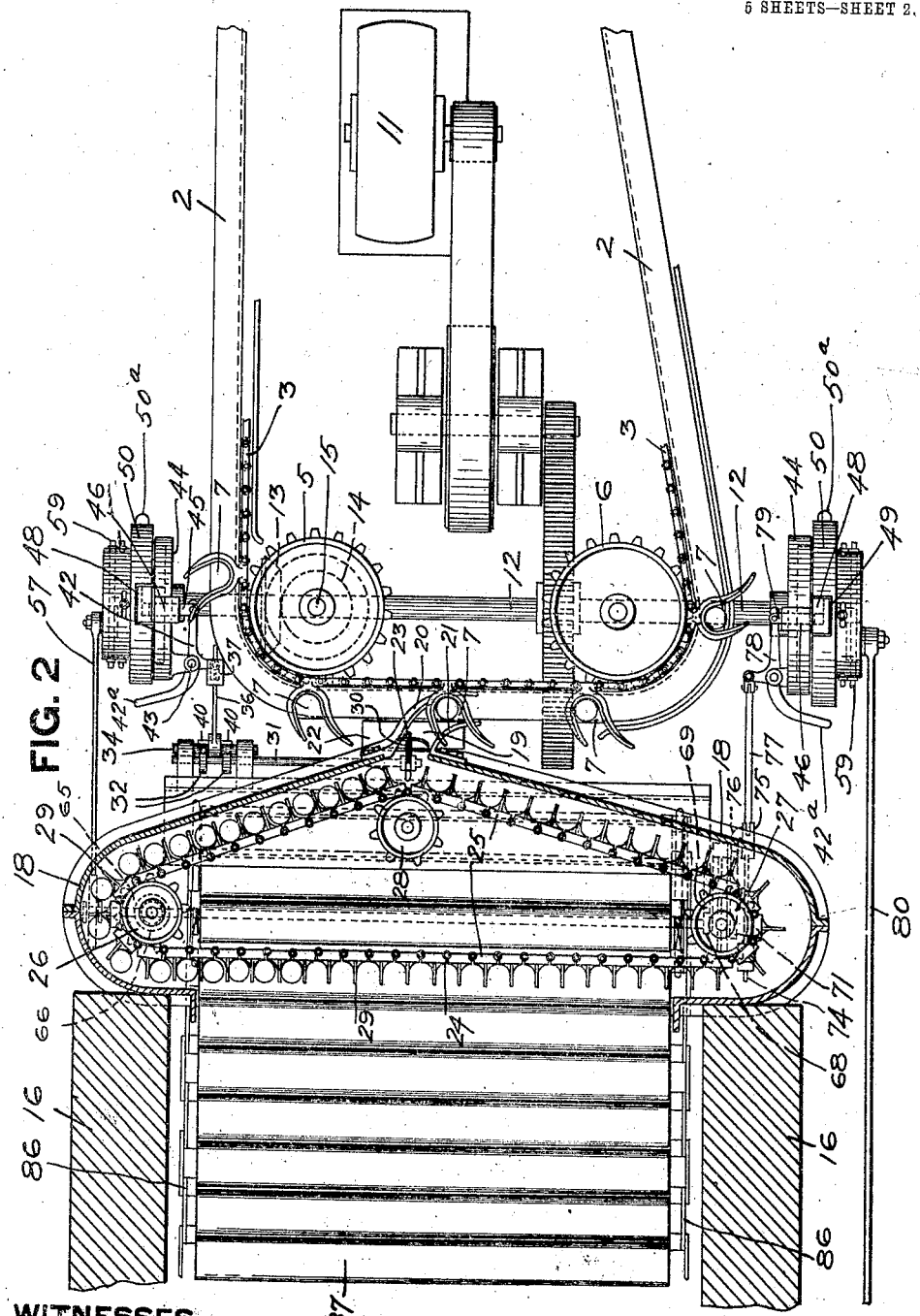

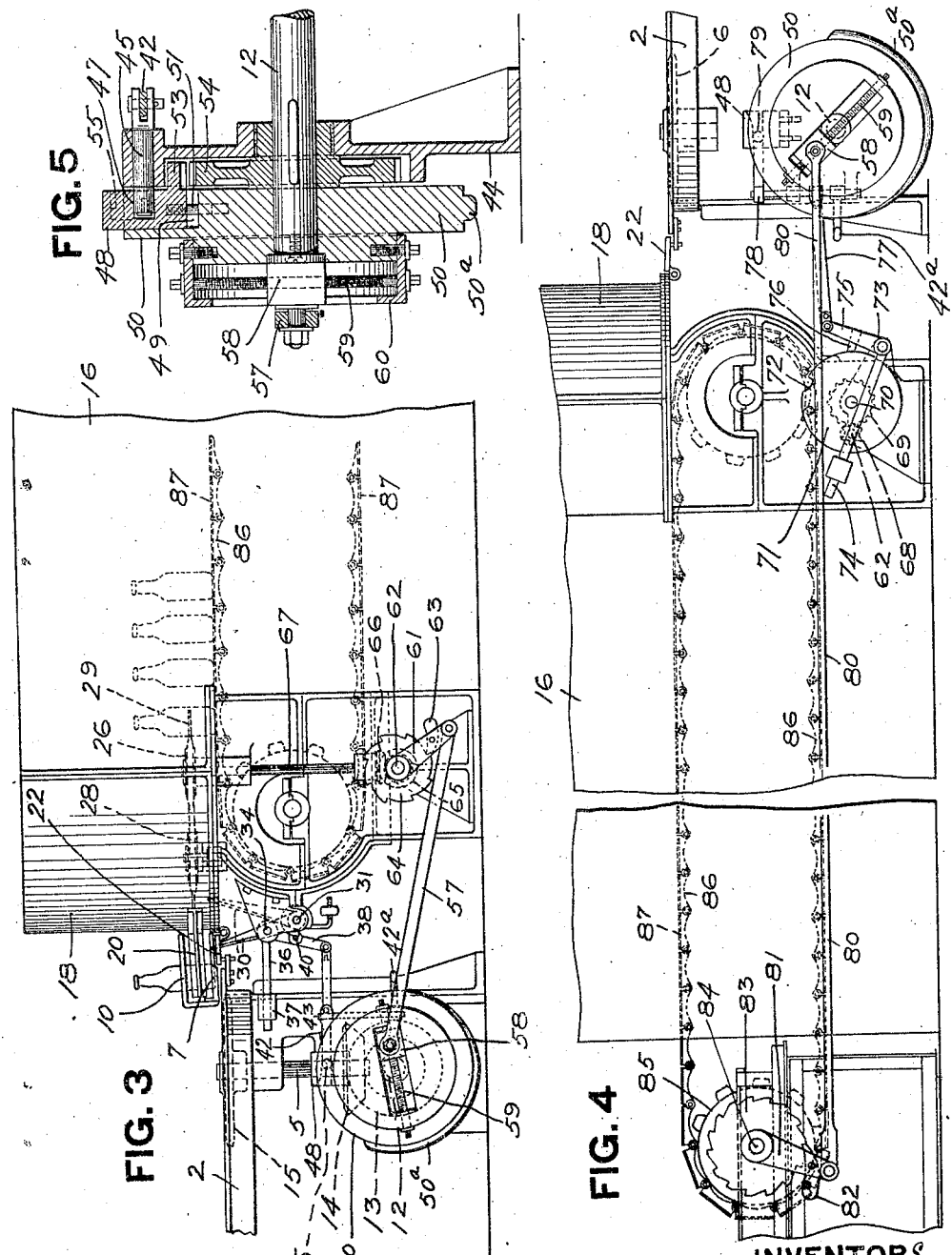

UNITED STATES PATENT OFFICE.

CHARLES R. KNAPP AND VERGIL MULHOLLAND, OF PITTSBURG, PENNSYLVANIA, ASSIGNORS TO HEYL & PATTERSON INCORPORATED, OF PITTSBURG, PENNSYLVANIA, A CORPORATION OF PENNSYLVANIA.

DEVICE FOR INTRODUCING GLASS TO LEERS.

No. 842,209.   Specification of Letters Patent.   Patented Jan. 29, 1907.

Application filed April 8, 1905. Serial No. 254,576.

*To all whom it may concern:*

Be it known that we, CHARLES R. KNAPP and VERGIL MULHOLLAND, residents of Pittsburg, in the county of Allegheny and State of Pennsylvania, have invented a new and useful Improvement in Devices for Introducing Glass to Leers; and we do hereby declare the following to be a full, clear, and exact description thereof.

Our invention relates to a device for introducing glassware to leers.

One of the main objects of our invention is to provide for the transfer of each piece of ware as it comes along on the ware-carrier, and the moving of the same into proper position with reference to the preceding one, so as to form a continuous line of ware without blank spaces, even though each tray of the ware-carrier as it comes to the transfer-point does not carry a piece of ware.

Another object of our invention is to provide means for transferring the ware from the ware-conveyer in such a manner that the ware will be conveyed to the leer-pans in consecutive order, so as to insure the different articles of ware being placed at proper intervals apart and at the same time so that all liability of the ware being upset in transfer to the leer will be obviated.

To these ends our invention comprises, generally stated, a ware-carrier adapted to bring the ware up into position to be transferred to the leer, and mechanism operated by each piece of ware itself for receiving the ware and advancing it by a step-by-step movement lengthwise of the pans of the leer, whereby the several pieces of ware are arranged side by side and in regular and continuous order along the pan of the leer.

To enable others skilled in the art to make and use our invention, we will describe the same more fully, referring to the accompanying drawings, in which—

Figure 1 is a plan view, partly broken away and partly in section, of our improved apparatus. Fig. 2 is an enlarged plan view showing more in detail the transfer mechanism. Fig. 3 is a side view showing the mechanism for driving the transfer mechanism by a step-by-step movement. Fig. 4 is a side view of the leer, showing the mechanism for advancing the leer-pans intermittently. Fig. 5 is an enlarged vertical section of the clutch. Fig. 6 is a face view of the clutch mechanism which is shown in section in Fig. 5. Fig. 7 is an enlarged detail view of the tripping mechanism for operating the clutch. Fig. 8 is an enlarged plan view of one of the ware-carrier pans. Fig. 9 is a side view of same; and Figs. 10, 11, 12, 13, and 14 are views of a modified form of tripping mechanism operating electrically.

In the drawings the numeral 2 designates a suitable framework, which may be extended to any length and in such position with reference to the furnace A and the shops B in the glass-factory, that the ware may be readily transferred from the shops to the ware-carrier 3, which is in the form of an endless chain traveling around and supported by said frame. Sprocket-wheels 4, 5, and 6 are provided for engaging and driving the chain.

Secured to the links of the chain 3 at suitable intervals are the pans or trays 7, which are adapted to support the ware, and to which the ware is transferred directly from the shops. Projecting out from the pans 7 are the arms 8 and 9, said arms curving outwardly, as clearly indicated in Fig. 8. The arm 8 is arranged at some distance above the arm 9, so that said arms will engage the article, such as a bottle, at two points, as indicated in Fig. 9. The pan 7 is further provided with an arm 10, somewhat shorter than the arms 8 and 9, and opposite thereto, said arm 10 projecting out substantially on the same plane as the upper arm 8. The rear of the pan 7 is preferably curved to conform in a general way to the rounded body of the glass article.

The chain 3 is driven by a suitable motor 11, which is connected by suitable speed-reducing gearing to the shaft 12, which is driven thereby. Mounted on the shaft 12 is a bevel-gear 13, which is adapted to mesh with the bevel-gear 14 on the vertical shaft 15, which carries the sprocket-wheel 5. In this manner power is transmitted from the motor for driving the chain 3.

Located at the front end of leer 16 is the passage or inlet 19. This passage or inlet 19 is formed by the projecting guides 20 21, which pass between the upper and lower arms 8 and 9 of the pan 7. A plate or shelf 22 bridges the space between the ware-carrier and the transfer mechanism, said shelf having the slots 23 formed therein. Within the leer 16 is the conveyer 24, which consists of the endless chain 25, engaging the sprocket-wheels 26, 27, and 28, said sprocket-wheels being arranged to impart to the conveyer a triangular form. The chain 25 has flights or wings 29 formed thereon, which form separate niches to receive each piece of ware as it is fed to the transfer mechanism.

Extending up through the slot 23 in the plate or shelf 22 is the arm 30, said arm being keyed to the shaft 31. Mounted on the shaft 31 are the disks 32, having the notches 33. Secured to the shaft 34 parallel with and slightly above the shaft 31 is the bell-crank lever 35. One arm 36 of said bell-crank lever has the weight 37 secured thereto. The short arm 38 of the bell-crank lever has the hub 39 formed thereon, from each side of which project the pins 40, which are surrounded by the casing containing ball-bearings 41. These pins 40 normally bear against the peripheries of the disks 32. The arm 38 is connected by the intermediate link 38$^a$ to the bell-crank 42 on the shaft 43 to the standard 44 on the shaft 12. The other arm of the bell-crank 42 is connected to the pin 45, which passes through the guide 46 in the standard 44, the inner end of said pin entering the recess 47 in the block 48. This block 48 is contained within a recess 49 in the clutch-disk 50, loosely mounted on the shaft 12. The block 48 is provided with the pins 51, which are adapted to enter the recesses in the disk 50. Projecting out from the block 48 is the toothed lug 53, whose teeth are adapted to mesh with the teeth of the gear-wheel 54, rigidly secured to the shaft 12. It is apparent from the above construction that when the pin 45 is withdrawn from an engagement with the block 48 said block will drop of its own weight, and the toothed lug 53 will be brought into engagement with the gear-wheel 54, whereupon a rotary motion will be imparted to the disk 50. The recess 47, with which the pin 45 engages, has the enlarged or flaring outline, (shown in Fig. 6,) forming the curved or cam face 55. On the standard 44 is the cam-guide 56, with which the projecting lug 53 of the block 48 is adapted to engage, said cam-guide being adapted to hold said lug in engagement with the gear-wheel 54. In order to throw the pin 45 into engagement with the block 48, we employ the arm 42$^a$ on the shaft 43. A cam 50$^a$ on the periphery of the disk 50 is adapted to engage the arm 42$^a$ when said arm has been thrown over into engagement with the periphery of said disk. The rotation of the disk causes the arm 42$^a$ to return the pin 45 in position to engage the block 48 when it comes round.

A pitman 57 is connected to the disk 50, and in order to provide for the adjustability of said pitman to delay its stroke the disk 50 is provided with the adjustable block 58. This block is mounted on the threaded bar 59, which engages the brackets 60, secured to the disk 50. By turning this bar 59, which passes through a threaded opening in the block 58, said block may be adjusted so as to change the position of the inner end of the pitman 57. The opposite end of the pitman 57 is secured to the crank 61 on the shaft 62. Mounted on the crank 61 is the pawl 63, which is adapted to engage the teeth of the ratchet-wheel 64, mounted on the shaft 62. A bevel-gear 65 upon the shaft 62 meshes with the bevel-gear 66 on the upright shaft 67, which carries the sprocket-wheel 26. In this manner power is applied to drive the conveyer 24 and impart an intermittent or step-by-step movement to same. On the opposite end of the shaft 62 is the pinion 68, which meshes with the gear-wheel 69, having a predetermined number of teeth, said gear-wheel 69 being mounted on the counter-shaft 70. A disk 71 is also secured to the shaft 70, said disk having the notch 72. A bell-crank 73 has the weighted arm 74, a short arm 75 of said bell-crank having the finger 76, adapted to bear against the periphery of the disk 71. The arm 75 is connected by the rod 77 to the bell-crank 78, which is adapted to operate a pin 79 similar to the pin 45 of the clutch mechanism at the opposite side of the machine. It is not deemed necessary to repeat the description of this clutch mechanism, which is exactly the same as we previously described and mounted on the opposite end of the shaft 12. A rod 80 connects the clutch mechanism on this side of the machine with the crank 81, which has the pawl 82, adapted to engage the ratchet-wheel 83 on the shaft 84, upon which the sprocket-wheels 85 are mounted at the forward end of the leer and around which the chain 86 passes, to which are secured the leer-pans 87. In this manner an intermittent movement is imparted to the leer-pans, which are adapted to advance each time a row of ware has been arranged thereon by the transfer mechanism, all as fully hereinafter described.

In Figs. 10, 11, 12, 13, and 14 we have illustrated means for operating the clutches electrically. In such case the trip-lever 90 has secured thereto the contact 91, which is adapted to be thrown into contact with the opposite contact-piece 92. In this way the circuit is formed and the coils of the solenoids 93 are magnetized, whereby the cores 94 are drawn in, said cores being connected at their outer ends by the cross-piece 95, to which is attached the pin 96. In the path of the cross-piece 95 is the switch-finger 98, by which the current is made to pass through the lamps 99, whereby the coils are prevented from burning out. In this manner the pin is withdrawn electrically for the same purpose, as illustrated and described above.

When our improved device is in operation, the ware as finished in the shops is placed upon the pans and carried around in front of the leer. Let it be supposed that the shops are working on bottles, and accordingly each bottle will be placed upon one of the pans 7. As the pan carrying the bottle travels around to the leer the bottle will enter the passage or channel 19, formed by the arms 20 and 21, and the arm 20 will engage the bottle and gradually move it into the channel. The bottle as it moves along in contact with the arm 20 will come into engagement with the upper end of the arm 30, projecting up through the slot 23 in the shelf 22, and said bottle will act to move said arm 30, as indicated in Fig. 3, over into position indicated in dotted lines in said figure. As the bottle continues to advance the arms 8 and 9 of the pan will engage the bottle and assist in advancing it, the outer curved ends of the arms 8 and 9 acting before the pan passes beyond the bottle to force the bottle into its proper niche between two of the flights of the conveyer 24. By the time this has occurred the arm 30 will be thrown over to its farthest position, whereupon the shaft 31 will be turned slightly, so as to bring the pins 40 into the notches 33 of the disks 32. The weight 37 will then act to operate the bell-crank 35, so that the arm 38 thereof will draw on the bell-crank 42 and withdraw the pin 45, so as to allow the block 48 to drop and bring the toothed lug 53 into engagement with the gear-wheel 54, fixed to the shaft 12. A rotary movement will then be imparted to the disk 50, the toothed lug 53 being held in engagement with the gear-wheel 54 by means of the cam-guide 56 until the cam-guide has passed. By this rotary movement imparted to the disk 50 the pitman 57 will be operated, and through it the pawl 63 will act to rotate the ratchet-wheel 64 on the shaft 70. The amount of movement of the shaft 70 is so adjusted that the movement transmitted to the vertical shaft 67 will just be sufficient to advance the conveyer 24 sufficiently to move the bottle just introduced one step and bring the next vacant niche of the conveyer into position to receive the next bottle. The forward end of the leer is highly heated, so that just as soon as a piece of ware enters one of the niches of the conveyer 24 the annealing begins, and there is no danger of the chilling of the ware. Just as soon as the lug 53 on the block 48 passes beyond the cam-guide 56 the cam-face 55 of the recess in the block 48 will come into contact with the pin, and the pin will thus act to lift the block 48 back to its original position, so that the lug 53 will be thrown from engagement with the gear-wheel 54. In the meantime another bottle has been brought around into the passageway 19, and it will be advanced in the same manner, the arm 30 being thrown over as in the previous case, so as to act to operate the clutch mechanism to advance the conveyer one step as before. In this manner the bottles are advanced one by one and are transferred along the pan of the leer until they extend along said pan in a separate line, whereupon the device is operated to advance the leer-pans. If it is found that the leer-pans will contain, for instance, sixteen bottles, the teeth on the gear-wheel 69 are in proper ratio, so that when one complete revolution of the gear-wheel 69 has been made by means of the gear 68 on the shaft 62 the disk 71 will have been rotated so as to bring the notch 72 around to be engaged by the pawl 76. The action of the weight 74 will draw the pawl into said notch, whereupon, through the connections described, the pin of the clutch on that side will be withdrawn as before, whereupon the disk 30 will be rotated and movement imparted to the rod 80, which will act through the pawl and ratchet 82 and 83 to drive the sprocket-wheel 85 sufficiently to advance the leer-pans for the distance of the width of one row of bottles. In this manner the leer-pans are brought into position for a new row, and the ware continues to be fed to it until it is filled, when the operations above described are repeated.

From the above it will be observed that the transfer mechanism only operates when there is a piece of ware brought up by the ware-carrier in position for transfer. If one of the trays of the ware-carrier comes along without a piece of ware, no movement is imparted to the transfer. As a consequence a continuous line of ware is always maintained on the leer-pans and each succeeding piece of ware moves up into proper position with reference to the preceding one. In like manner, by having the bottles delivered from the ware-carrier to the transfer mechanism in the way above set forth, there is no danger of the bottles being upset, while at the same time they are delivered to the leer-pans in a separate uniform line and at equal distances apart, so that when the leer-pan is advanced the bottles will be properly separated. The device works evenly and without jars or jolting, so that the loss from breakage is practically reduced to a minimum.

What we claim is—

1. The combination with a leer, of a movable carrier arranged within said leer, a ware-carrier adapted to convey the ware to said leer, mechanism for transferring the ware from said ware-carrier to said movable carrier, and means for operating said transfer mechanism in the path of the ware into bodily contact with which the ware comes in moving from said ware-carrier to said movable carrier.

2. The combination with a leer, of a movable carrier arranged within said leer, a ware-carrier adapted to convey the ware to said leer, mechanism adapted to transfer the ware from said ware-carrier into said leer by a step-by-step movement, and means for operating said transfer mechanism in the path of the ware into bodily contact with which the ware comes in moving from said ware-carrier to said movable carrier.

3. The combination with a leer, of a movable carrier arranged within said leer, a ware-carrier adapted to convey the ware to said leer, an endless conveyer adapted to receive the ware from said ware-carrier and deposit the same on said movable carrier, mechanism for imparting an intermittent movement to said conveyer, and means for operating said mechanism in the path of the ware into bodily contact with which the ware comes in moving from said ware-carrier to said movable carrier.

4. The combination with a leer, of a movable carrier arranged within said leer, a ware-carrier adapted to convey the ware to said leer, mechanism for transferring the ware from said ware-carrier to said movable carrier, and a guide in the path of said ware-carrier adapted to feed the ware to said transfer mechanism.

5. The combination with a leer, of a movable carrier arranged within said leer, a ware-carrier adapted to convey the ware to said leer, an endless conveyer adapted to deposit the ware on the leer-pans, and a guide in the path of said ware-carrier adapted to transfer the ware to said conveyer, and means for imparting an intermittent movement to said conveyer.

6. The combination with a leer, of a movable carrier arranged within said leer, a ware-carrier adapted to convey the ware to said leer, an endless conveyer adapted to deposit the ware on the leer-pans, a guide-arm in the path of said ware-carrier adapted to engage the ware and transfer it to said conveyer, and means for imparting an intermittent movement to said conveyer.

7. The combination with the leer, of a movable carrier arranged within said leer, a ware-carrier adapted to convey the ware to said leer, an endless conveyer triangular in outline adapted to deposit the ware on the leer-pans, means for transferring the ware from said ware-carrier to said conveyer at its apex, and means for imparting an intermittent movement to said conveyer.

8. The combination with a leer, of a movable carrier arranged within said leer, a ware-carrier adapted to convey the ware to said leer, an endless conveyer adapted to deposit the ware on the leer-pans, mechanism for transferring the ware from said ware-carrier to said conveyer, mechanism for imparting an intermittent movement to said conveyer, and means for operating said transfer mechanism in the path of the ware into bodily contact with which the ware comes in moving from said ware-carrier to said movable carrier.

9. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a tripper-arm directly in the path of said ware, and connections between said tripper-arm and said mechanism.

10. The combination with a leer, of a movable carrier arranged within said leer, a ware-carrier adapted to convey the ware to said leer, an endless conveyer adapted to deposit the ware on the leer-pans, means for transferring said ware from said ware-carrier to said conveyer, mechanism for imparting an intermittent movement to said conveyer, a tripper-arm in the path of the ware, a power-shaft, clutch mechanism on said power-shaft, and connections between said arm and said clutch mechanism for operating same.

11. The combination with a leer, of a movable carrier arranged within said leer, a ware-carrier adapted to convey the ware to said leer, an endless conveyer adapted to deposit the ware on the leer-pans, mechanism for imparting an intermittent movement to said conveyer, a tripper-arm in the path of the ware, a shaft on which said arm is mounted, a notched disk on said shaft, a bell-crank, a pin on said bell-crank engaging the periphery of said disk, means for throwing said pin into said notch, and connections between said bell-crank and said mechanism for imparting an intermittent movement to said conveyer.

12. The combination with a leer, of a movable carrier arranged within said leer, a ware-carrier adapted to convey the ware to said leer, an endless conveyer adapted to deposit the ware on the leer-pans, mechanism for imparting an intermittent movement to said conveyer, a tripper-arm in the path of the ware, a shaft on which said arm is mounted, a notched disk on said shaft, a weighted bell-crank, and connections between said weighted bell-crank and said mechanism for imparting an intermittent movement to said conveyer.

13. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a tripper-arm in the path of the ware, a shaft on which said tripper-arm is mounted, a notched disk on said shaft, a bell-crank, a pin on said bell-crank engaging the periphery of said disk, a power-driven shaft, a clutch on said shaft, connections between said clutch and said mechanism for imparting an intermittent movement to said conveyer, and connections between said bell-crank and said clutch mechanism for throwing the same into engagement with said shaft.

14. The combination with the leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a tripper-arm in the path of the ware, a shaft on which said tripper-arm is mounted, a notched disk on said shaft, a weighted crank-arm, a pin on said arm engaging the periphery of said disk, a power-shaft, a gear-wheel on said shaft, a clutch-disk loosely mounted on said shaft, a vertically-movable lug in said disk adapted to engage said gear-wheel, a pin adapted to engage said lug to normally hold the same out of engagement with said gear-wheel, connections between said bell-crank and said pin for withdrawing same, and connections between said clutch-disk and said mechanism for imparting an intermittent movement to said conveyer.

15. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-driven shaft, a gear-wheel on said shaft, a clutch-disk loosely mounted on said shaft, a gravity-operated block in said disk, said block having teeth adapted to engage said gear-wheel, means for holding said block out of engagement with said gear-wheel, means for releasing said block by the movement of the ware, and connections between said clutch-disk and the mechanism for imparting an intermittent movement to said conveyer.

16. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel on said shaft, a clutch-disk loosely mounted on said shaft, a gravity-operated block in said disk having teeth adapted to engage said gear-wheel, a pin engaging said block to hold it out of engagement with said gear-wheel, means for withdrawing said pin by the movement of the ware, and connections between said clutch-disk and said mechanism for imparting an intermittent movement to said conveyer.

17. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel on said shaft, a clutch-disk loosely mounted on said shaft, a gravity-operated block in said disk having teeth adapted to engage said gear-wheel, a pin engaging said block to hold it out of engagement with said gear-wheel, means for withdrawing said pin by the movement of the ware, means for returning said pin to place, and connections between said clutch-disk and said mechanism for imparting an intermittent movement to said conveyer.

18. The combination with a leer, of a movable carrier arranged within said leer, a ware-carrier adapted to convey the ware to said leer, an endless conveyer adapted to deposit the ware on the leer-pans, mechanism for transferring the ware from said ware-carrier to said conveyer, mechanism for imparting an intermittent movement to said conveyer, a power-shaft, clutch mechanism on said shaft, means for operating said clutch mechanism in the path of the ware into bodily contact with which the ware comes in moving from said ware-carrier to said movable carrier, and connections between said clutch mechanism and the mechanism for imparting intermittent movement to said conveyer.

19. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, and means for operating said mechanism by the contact of the ware.

20. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel on said shaft, a clutch-disk, a gravity-block in said disk, a lug on said block having teeth adapted to engage the teeth of said gear-wheel, means for holding said block out of engagement with said gear-wheel, means for releasing said block by the movement of the ware, means for holding said block in engagement with said gear-wheel, and connections between said clutch-disk and said mechanism for imparting an intermittent movement to said conveyer.

21. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel on said shaft, a clutch-disk loosely mounted on said shaft, a gravity-operated block in said disk, a toothed lug on said block adapted to engage said gear-wheel, means for holding said block out of engagement with said gear-wheel, means for releasing said block by the movement of the ware, a cam-guide adapted to engage said block and hold the same in contact with said gear-wheel, means for disengaging said lug from said gear-wheel, and connections between said clutch-disk and mechanism for imparting intermittent movement to said conveyer.

22. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel on said shaft, a clutch-disk loosely mounted on said shaft, a gravity-operated block in said disk, said block having teeth adapted to engage said gear-wheel, means for holding said block out of engagement with said gear-wheel, means for releasing said block by the movement of the ware, means for holding said block in engagement with said gear-wheel, means for throwing the same out of engagement with said gear-wheel, and connections between said clutch-disk and the mechanism for imparting an intermittent movement to said conveyer.

23. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, mechanism for imparting an intermittent movement to said conveyer, a power-shaft, a gear-wheel mounted on said shaft, a clutch-disk loosely mounted on said shaft, a gravity-operated block having teeth adapted to engage said gear-wheel, a pin adapted to hold said block out of engagement with said gear-wheel, means for releasing said pin by the movement of the ware, means for holding said block in engagement with said gear-wheel, said block having a cam-face adapted to be engaged by said pin to lift said block out of engagement with said gear-wheel, and connections between said clutch-disk and mechanism for imparting an intermittent movement to said conveyer.

24. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, a power-shaft, a clutch-disk on said shaft, means for throwing said disk into engagement with the shaft by the movement of the ware, a pitman connected to said disk, a shaft, a crank-arm on said shaft with which said pitman is connected, a pawl on said crank, a ratchet-wheel on said last-named shaft, and connections between said shaft and said endless conveyer.

25. The combination with the leer, of a movable carrier arranged within said leer, a ware-carrier adapted to convey the ware to said leer, an endless conveyer adapted to deposit the ware on the leer-pans, means for transferring said ware from said ware-carrier to said conveyer, a shaft, mechanism for imparting an intermittent rotary movement to said shaft, connections between said shaft and said conveyer, a gear-wheel on said shaft, a second gear-wheel having a predetermined number of teeth with which said first-named gear-wheel engages, a shaft on which said last-named gear-wheel is mounted, connections between said shaft, and means for driving said movable carrier.

26. The combination with a leer, of a movable carrier arranged within said leer, a ware-carrier adapted to convey the ware to said leer, an endless conveyer adapted to deposit the ware on the leer-pans, means for transferring the ware from said ware-carrier to said conveyer, a shaft, mechanism for imparting an intermittent rotary movement to said shaft by the movement of the ware, connections between said shaft and said conveyer, a gear-wheel on said shaft, a second shaft, a gear-wheel on said second shaft having a predetermined number of teeth with which said first gear-wheel meshes, a notched disk on said second shaft, a bell-crank having a lug engaging the periphery of said disk, means for throwing said lug into the notch in said disk, and connections between said bell-crank and the mechanism for advancing said movable carrier.

27. The combination with a leer, of a movable carrier arranged within said leer, a ware-carrier adapted to travel adjacent to the receiving end of said leer, trays on said ware-carrier, arms extending out from said trays, a conveyer, a guide-arm in the path of the ware to transfer said ware from the tray to said conveyer, and mechanism for imparting an intermittent movement to said conveyer.

28. The combination with a leer, of a movable carrier arranged within said leer, a ware-carrier adapted to travel adjacent to the receiving end of said leer, trays on said ware-carrier, a conveyer, a guide-arm in the path of the ware to transfer said ware from the pan to said conveyer, mechanism for imparting an intermittent movement to said conveyer and curved arms extending out from said ware-carrier.

29. The combination with a leer, of a movable carrier arranged within said leer, a ware-carrier adapted to travel adjacent to the receiving-opening of said leer, trays on said ware-carrier, an arm carried by said ware-carrier, a transfer device, and a guide-arm in the path of the ware to guide said ware to said transfer device.

30. The combination with a leer, of a movable carrier arranged within said leer, a ware-carrier adapted to travel adjacent to the receiving-opening of said leer, trays on said ware-carrier, arms carried by said ware-carrier, a transfer device, a guide-arm in the path of the ware to move said ware into engagement with said transfer mechanism, said guide-arm passing between said arms.

31. The combination with a leer, of a movable carrier arranged within said leer, a ware-carrier adapted to convey the ware to said leer, intermittently-operated mechanism for transferring the ware from said ware-carrier to said movable carrier, a ratchet-wheel, connections between said ratchet-wheel and said transfer mechanism, a pawl adapted to engage said ratchet-wheel, and means for operating said pawl in the path of the ware into bodily contact with which the ware comes in moving from said ware carried to said movable carrier.

In testimony whereof we, the said CHARLES R. KNAPP and VERGIL MULHOLLAND, have hereunto set our hands.

CHARLES R. KNAPP.
VERGIL MULHOLLAND.

Witnesses:
ROBERT C. TOTTEN,
G. C. RAYMOND.